March 4, 1924.

H. DELANO ET AL 1,485,836

VEHICLE MOUNT

Filed March 22, 1919    4 Sheets-Sheet 1

Witness
Ernest O. Croker

Inventors
H. Delano,
and G. A. Chadwick
S. V. Kemp
By
Attorney

March 4, 1924. 1,485,836
H. DELANO ET AL
VEHICLE MOUNT
Filed March 22, 1919  4 Sheets-Sheet 3

Inventors
H. Delano,
G. A. Chadwick
and S. V. Kemp
By Attorney.

Witness
Ernest H. Crocker

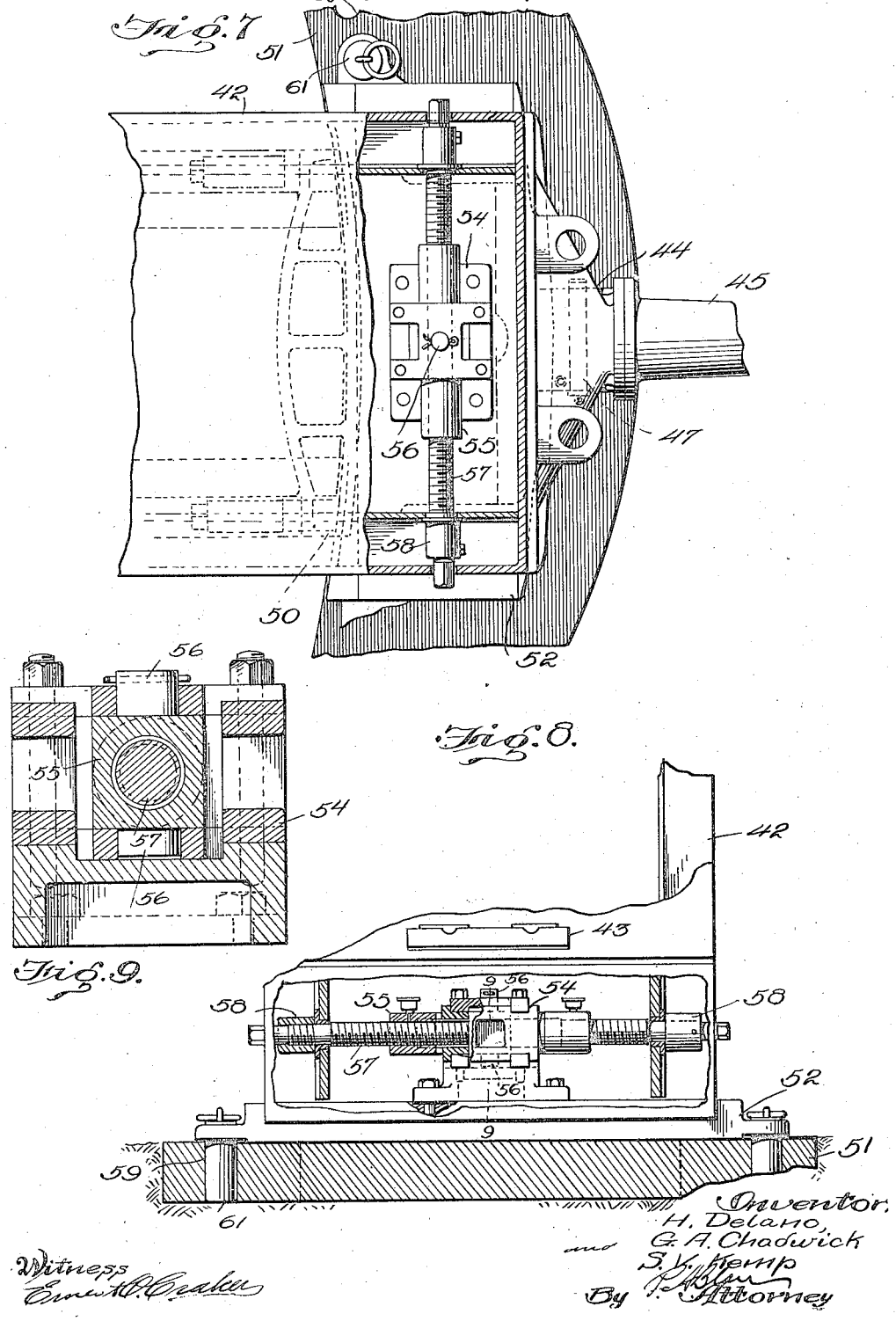

Patented Mar. 4, 1924.

1,485,836

UNITED STATES PATENT OFFICE.

HARVEY DELANO, OF WASHINGTON, DISTRICT OF COLUMBIA, AND GEORGE A. CHADWICK, OF WASHINGTON GROVE, AND SILAS V. KEMP, OF BALTIMORE, MARYLAND, ASSIGNORS TO THE GOVERNMENT OF THE UNITED STATES.

VEHICLE MOUNT.

Application filed March 22, 1919. Serial No. 284,473.

*To all whom it may concern:*

Be it known that we, HARVEY DELANO, GEORGE ALBERT CHADWICK, and SILAS VIRGINIUS KEMP, citizens of the United States, residing at Washington, District of Columbia, Washington Grove, Maryland, and Baltimore, Maryland, respectively, have invented new and useful Improvements in Vehicle Mounts, of which the following is a specification.

This invention relates to vehicles having traction units of the endless track type wherein an endless track, successive portions of which come into contact with the ground, and track-bearing members which maintain the track in contact with the ground and travel upon the track as the latter is laid, are provided.

It is the aim of the present invention to provide an improved vehicle of the endless track type which is particularly adapted for use as a portable mounting for ordnance, and especially guns of large sizes, the structure being such that it may be readily and quickly transported from place to place over soft, muddy, and uneven terrain, and will serve as a strong, rigid and firm supporting base or emplacement from which the gun carried thereby may be fired.

The purpose of the present invention is to provide certain improvements in vehicles having traction units of the endless track type, whereby the endless tracks are enabled to obtain a good bearing surface on the ground traversed, irrespective of any inequalities therein; all shocks or excessive strains on the parts of the vehicle and the ordnance are eliminated, or, at least, reduced to a minimum so as to prevent injury to the structure; the vehicle may be readily maintained against movement during firing of the gun so that the vehicle serves as a firm and rigid mount during firing; and the gun may be accurately trained on a target; and, generally, to provide a structure which is reliable and efficient in operation and strong in structure.

While in the present disclosure of our invention we have shown and described our improved vehicle as being employed as a mount for ordnance, it is to be understood that it is applicable to other uses than that herein shown and it may be employed to carry heavy weights other than guns, the present disclosure being illustrative only of our invention and not being restrictive thereof.

The above and other objects of our invention are obtained in the structure described in the following specification and illustrated in accompanying drawings, and, wherein:

Figure 5 is a horizontal sectional view through a portion of one of the traction units, the same being taken substantially on line 5—5 of Figure 4;

Figure 6 is a sectional view of one of the hereinafter described pedestals and is taken on line 6—6 of Figure 4;

Figure 7 is a partial sectional view taken horizontally through the trail of the gun carriage and showing in detail the training mechanism.

Figure 8 is a sectional view taken vertically through the training mechanism;

Figure 9 is a sectional view taken on line 9—9 of Figure 8; and,

Figure 10 is a view in horizontal section of one of the brake mechanisms and Figure 11 as a vertical sectional view taken through one of the springs 27 and associated parts, Figure 4.

Figure 1:
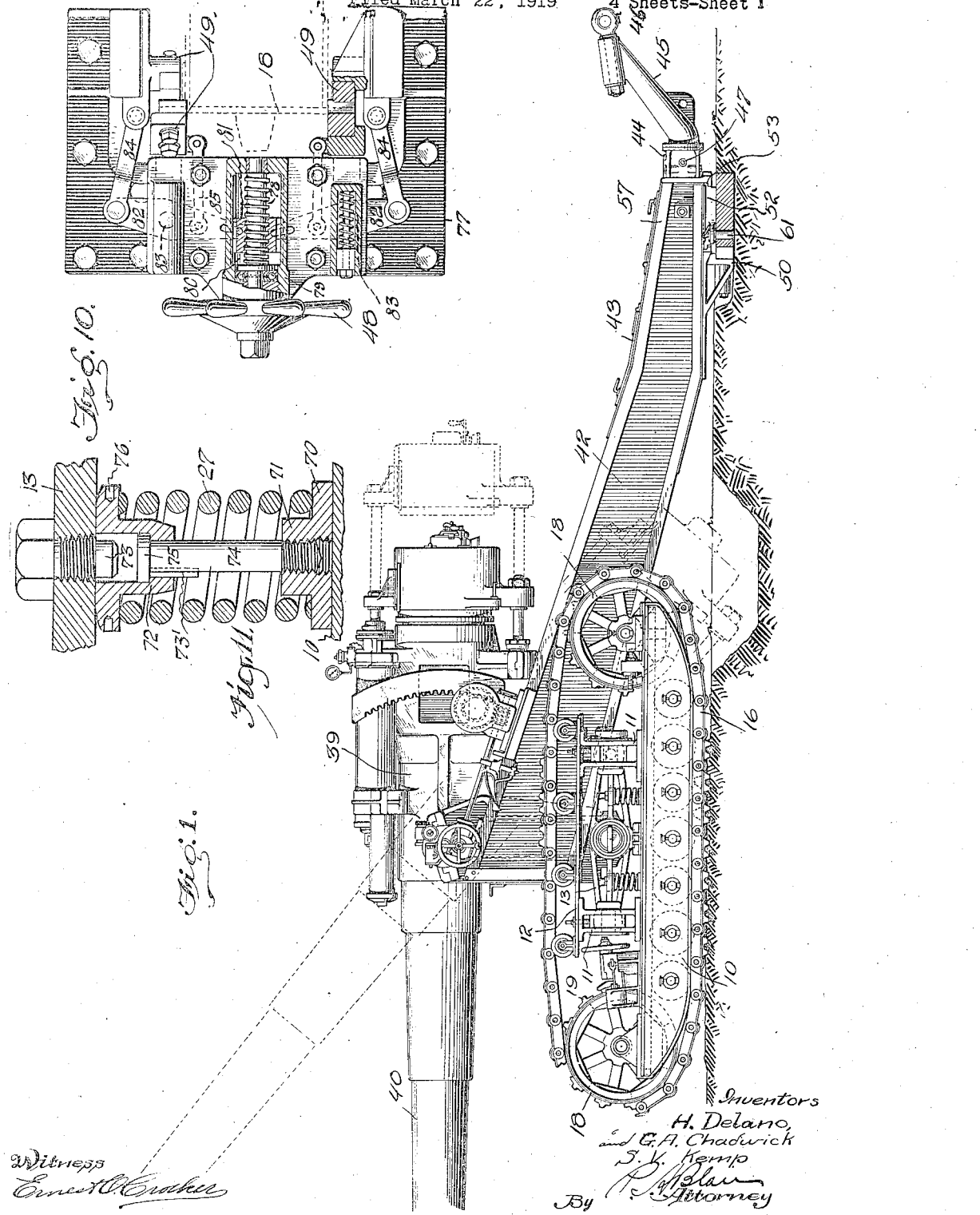
Figure 1 is a side elevational view of our improved structure.
Figure 2:
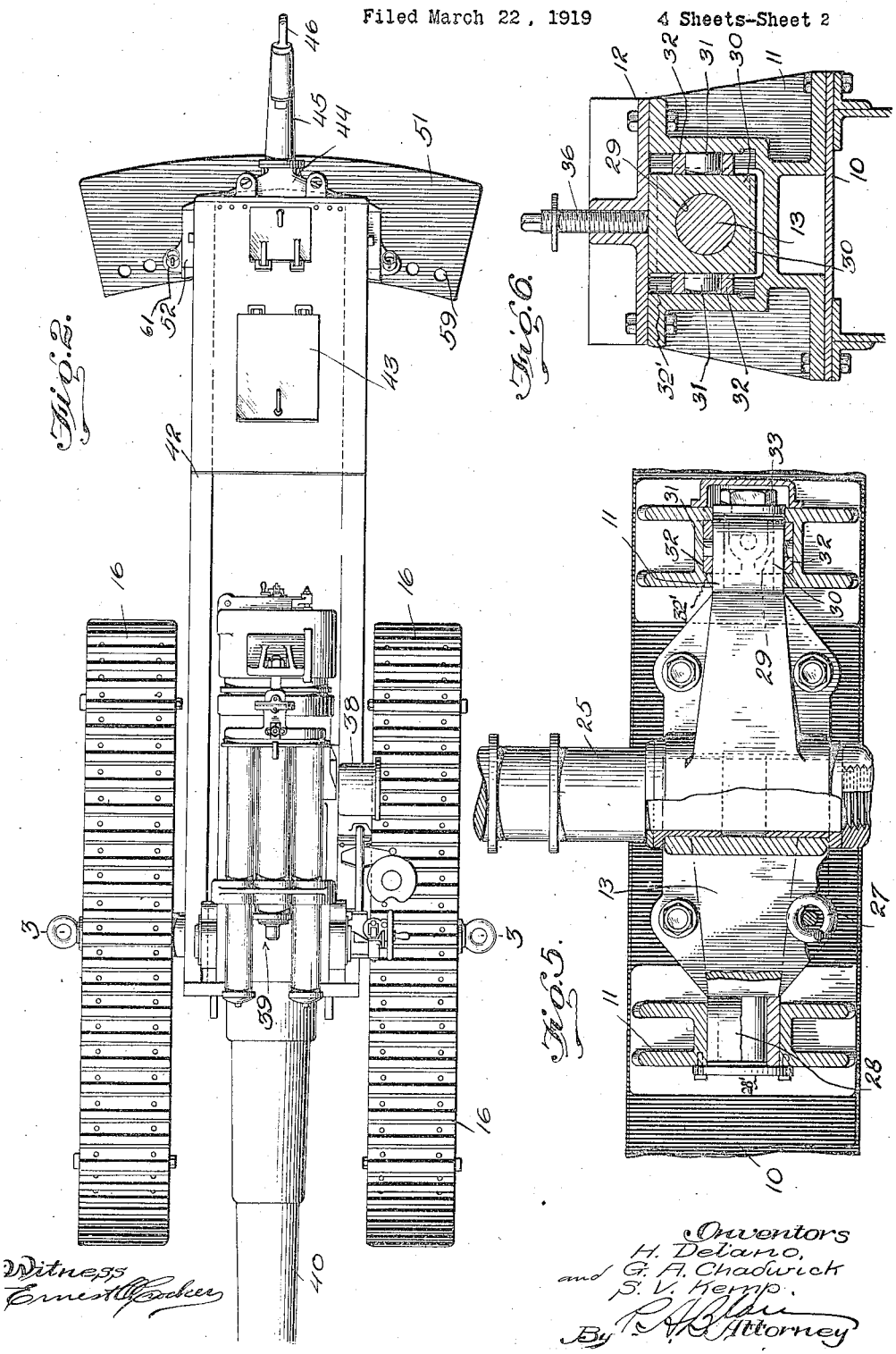
Figure 2 is a top plan view thereof.
Figure 3:
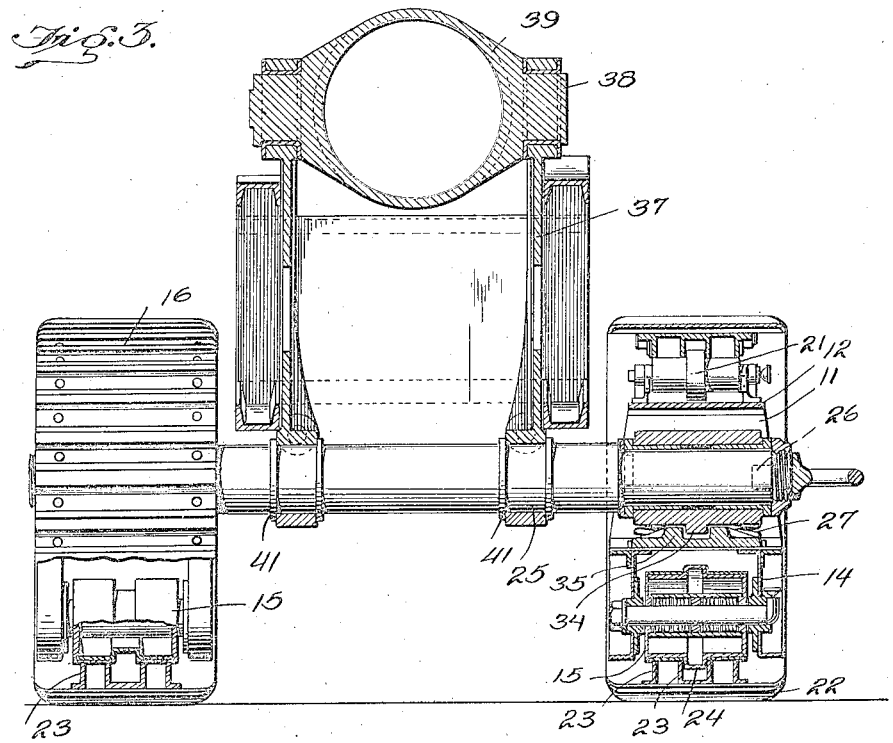
Figure 3 is a sectional view taken substantially on line 3—3 of Figure 2.
Figure 4:
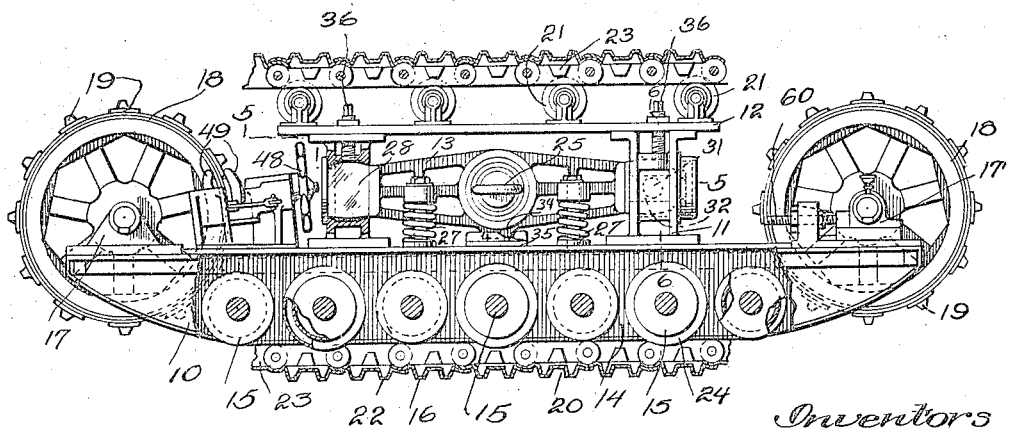
Figure 4 is the side view of one of the traction units, parts thereof being shown in elevation and other parts being illustrated in section for purposes of clearness.

Our improved machine has a pair of traction units, which are similar in structure and each of which has a truck frame comprising, generally, a sub-frame 10, a pair of spaced-apart pedestals 11 arising therefrom, and a sill 12 secured to and resting upon the tops of the pedestals. The numeral 13 designates a journal beam, the ends of which are mounted in suitable bearing blocks slidably carried by the pedestals 11, as described hereinafter more in detail. The sub-frame 10, in cross-section, is of inverted U shape or channel shape, and between the depending webs or flanges 14 thereof are journaled track-bearing rollers 15, the lower portions of which are substantially in horizontal alignment, and these rollers form a bed which maintains the lower run of the endless track 16 in contact with the ground, and travel upon this track as the latter is laid. Arising from the front and rear ends of the sub-frame 10 are brackets 17 and 17' respectively, having bearings in which are journaled wheels 18, having on their peripheries and intermediate the edges thereof, teeth 19 which cooperate with teeth 20 on the inner surface of the endless track 16. Carried in brackets arising from the sill 12 are supporting rollers 21 over which rides the upper run of the track so that this portion of the endless track is prevented from sagging. The bearing bracket 17' for the rear sprocket wheel 18 is preferably adjustable, it being moved forwardly or rearwardly by means of the threaded rod 60 so that the distance between the two wheels 18 may be varied and the tautness of the endless track thus regulated.

The endless tracks 16 may be of any suitable construction, but, preferably, each has a plurality of tread plates 22 corrugated transversely for the purpose of strengthening the same. Each tread plate 22 is secured to a casting 23. The castings of the several plates 22 are pivotedly connected together and form a trackway upon which the rollers 15 ride. One or more of the rollers 15 and 21 are provided with a centrally disposed circumferential rib 24 adapted to engage in the channels of the castings 23 to prevent the endless track from becoming displaced relative to the rollers.

The journal beam 13 of each traction unit has a centrally located opening or bearing which rotatably receives a transverse axle or shaft 25 constituting the sole connection between the two units. The ends of the shaft 25 are threaded so as to receive nuts 26 which retain the traction units upon the shaft. For the purpose of preventing the transmittal of shocks to the ordnance, and to minimize the strain and wear upon the parts during transportation of the vehicle, coiled springs 27 are interposed between the sub-frame 10 and the beams 13, each traction unit being illustrated in the present instance as having four such springs, although, of course, the number thereof may be varied as found most suitable. Referring more particularly to Figure 11 it will be noted that the lower ends of springs 27 are mounted on plates 70 rigidly secured to the top of subframe 10, the springs 27 being prevented from displacement by integral extensions 71 on the plates 70, and cup-shaped members 72 having engagement with set screws 73 in the beams 13. Bolts 74 having heads 75 within the cup-shaped members 72 and slidably keyed thereto at 73', are arranged for screw threaded engagement at their lower ends with the plates 70. Sockets 76 are provided in the cup-shaped members 72 for the reception of a suitable wrench for compressing the springs 27 and insuring rigidity of these parts when the ordnance is in position for firing, or for regulating the resiliency of the springs 27. Each end of each journal beam 13 has a trunnion of cylindrical form and the forward trunnion is received by an opening in a bearing block 28 and the rearward trunnion by an opening 29 in a bearing block 30, these blocks being vertically guided in the front and rear pedestals 11 respectively. When the vehicle is passing over rough terrain having a transverse inclination to the vehicle it will be seen that the above described spring construction will allow the frame to rock about the longitudinal axes of the beams 13 trunnioned in the blocks 28 and 30. For the purpose of permitting the beams 13 to rock relatively to the main portion of the truck frame and the track carried thereby, the bearing blocks 28 and 30 have their upper and lower surfaces curved longitudinally and the rearmost block 30 has on its opposite sides gudgeons 31 rotatably engaging in bearings in slidable plates 32 mounted within pockets 32' in the rearmost pedestal 11. A nut 33 is threaded on a stud extending from the rear end of the beam 13, and has a flange engaging the rear face of the block 30. The slidable plates 32 and the nut 33 form a connecting means between the beam 13 and the frame 10. Since there is no fixed connection between the forward trunnion of the beam 13 and the block 28, the forward trunnion is free to move within and with the block 28, it being understood that sufficient play is necessary within the pedestal 11 to allow the blocks 28 and 30 to rock on their curved surfaces, as clearly shown in Figures 5 and 6. The block 28 is prevented from displacement in the pedestal 11 by a plate 28' bolted to the forward pedestal 11. It will thus be obvious that when the vehicle is passing over rough or uneven terrain the beam 13 may have a relative rotary movement with respect to the frame 10 about a transverse axis, namely, the axle 25, and that the beam 13 will rock or fulcrum on the curved surfaces of the blocks 28 or 30 according to the direction of inclination of the ground traversed, the forward trunnion of the beam 13 being free to move within the block 28. For the purpose of preventing excessive rotary movement of the truck frame relative to the beam 13, the journal beam has a depending lug or flange 34 engaging in the groove of a plate 35 fixed to the upper surface of the sub-frame 10. While we have described the truck frames as having a rocking movement about longitudinal axes, it is to be understood that, if desired, this feature may be eliminated, in which event the lugs 34 would be made so as to have a snug but sliding fit in the grooves of the plates 35.

It will be understood that by mounting the journal beams 13 in the truck frames of the traction units, and allowing sufficient clearance between the lug 34 and plate 35, each endless track has a limited rotary or rocking movement relative to the journal beam 13 and the shaft 25 about an axis passing longitudinally through the traction unit, so that the endless tracks 16 may readily accommodate themselves to irregularities or inclinations in the surface traversed. In the event one of the tracks 16 should be traveling over a horizontal surface and the other track over a surface inclined transversely relatively to the first surface, the latter track would automatically be brought to the correct angle so that both of the tracks will have its tread surface resting squarely on the surface of the ground traversed. By permitting relative rotary movement between the beams 13 and the tracks 16 about a transverse axis, namely the axle 25, one of the tracks may pass over an undulation or rise in the ground without disturbing to any great extent the other track. In other words, the two traction units have a limited rotary movement about a common transverse axis, and each of the units may have a rotary movement about its own longitudinal axis so that both of the tracks may readily accommodate themselves to the nature of the ground traversed.

It will be understood that when transporting the vehicle from place to place, the arrangement is such that the springs 27 are effective in resiliently supporting the journal beams 13 and the parts carried thereby so as to relieve the parts from excessive shocks or jars occasioned when passing over uneven terrain, but, when it is desired to fire the gun carried by the vehicle, it is requisite that this feature of resiliency be rendered ineffective, and to this end each of the pedestals 11 is provided with a clamping bolt 36 screwed into a threaded opening in the sill 12 carried by the pedestals 11, and the lower ends of these bolts engage against the upper surfaces of the bearing blocks 28 and 30. When these bolts or screws 36 are rotated in the proper direction, the blocks 28 and 30 are forced downwardly against the bottom of the pedestals so that there is no movement between the beams 13 and the truck frames of the traction units.

The numeral 37 designates the side cheeks of a gun carriage, which cheeks are provided at their lower ends with bearings for the reception of the shaft 25 and at their upper ends the cheeks have the usual bearings which receive the trunnions 38 of the gun slide 39 in which a gun 40 is adapted to recoil in the line of fire. Collars or circumferential ribs 41 carried by the shaft 25 maintain the gun carriage against lateral movement upon the shaft.

The gun may be provided with the proper appurtenances for controlling the recoil, elevating the gun, and sighting the same but as these appurtenances are old and well known in the art, detailed descriptions thereof are not necessary.

Secured to the cheeks 37 of the mount is a trail 42 having downwardly and rearwardly inclined beams between the rear ends of which are provided suitable compartments 43 for receiving such paraphernalia as is to accompany the gun. Forwardly of the compartments 43, the space between the beams of the trail 42 is unobstructed so that the gun may be brought to a high elevation with the breech end of the gun positioned between the beams 42 as shown by dotted lines in Figure 1.

Swiveled in a socket of a bracket 44 carried by the rear end of the trail 42 is a post or limber arm 45 having an eye 46 adapted to receive a suitable hook located on a limber or trailer, the trailer not being shown in the present instance, as it may be of any suitable type of wheeled vehicle. When the trail of the gun mount is on the ground, as it is when the gun is to be fired, the post or arm 45 is in an upwardly inclined position and may be maintained in this position by a pin 47 extending through the post and the socket 44. When it is desired to move the vehicle from place to place, the pin 47 is withdrawn, the post 45 is given half a rotation and maintained in a downwardly inclined position by pin 47 and after the eye 46 is threaded onto the hook of the trailer the rear end of the trail is sufficiently raised above the ground to prevent danger of dragging.

For the purpose of preventing movement of the carriage when the gun is fired, it being understood that the recoil of the gun is considerable, each of the traction units is provided with a brake mechanism cooperating with the forward sprocket wheel 18 and while these mechanisms may be of any suitable construction, we have shown each of the same as having an operating wheel 48 and four brake shoes 49, two of the shoes being adapted to frictionally engage the inner periphery of the wheel 18 and the other two, the smooth surfaces on the outer periphery and to each side of the line of teeth 19. Each brake mechanism is so constructed that upon rotation of the wheel 48 in the proper direction the two sets of shoes 49 are brought towards each other and the band or felly of the wheel 18 is gripped therebetween. The brake mechanism is preferably mounted on a plate 77 secured to the frame 10 in juxtaposition to the wheel 18. The wheel 48 is keyed on a screw-threaded shaft 78 rotatably mounted in an upwardly extending bracket 79 secured by bolts to the plate 77. The bracket 79 is provided with a hollow rectangular portion 80 adapted to house a traveling block 81 having screw-threaded engagement with the shaft 78. Levers 82 pivoted at 83 beneath the bracket 79 and having slotted connection at their inner ends with the traveling nut 81 are connected at their outer ends by links 84 to brake-shoes 49 adapted to engage the inner periphery of the wheels 18. Links 85 are pivotally connected to the levers 82 between the pivots 83 and the traveling block 81 and to the brake-shoes 49, cooperating with the outer surface of the wheels 18. It will thus be seen that the wheel 48 may be turned to move the traveling nut 81 towards the wheels 18 whereby motion is transferred by the levers 82 to the links 84 and 85 to move the brake-shoes 49 slidably mounted on the plates 77 to engage the outer and inner surfaces of the wheel 18. To further prevent movement of the carriage upon recoil of the gun, the trail at its rearward end and on its under surface has a thrust beam 50 which may be of any suitable construction and which is adapted to lie within a hollow of the ground and engage against a timber 51.

For the purpose of accurately training the gun, means for training the same through a small angle without manually lifting the trail are provided, and this means (shown most clearly in Figures 7, 8 and 9) comprises, in part, a plate 52 slidably mounted in guideways 53 located on the under side of the trail. The plate 52 which rests upon the surface of the timber 51 extends transversely of the trail and has a bracket or housing 54 through which passes a nut 55. The nut 55 has a pair of vertically disposed trunnions 56 rotatably mounted in the bracket 54 so that the nut is pivoted on a vertical axis. Passing through the nut 55 is a screw 57, the outer ends of which extend beyond the sides of the trail and are squared to receive a wrench. The screw 57 is maintained against relative movement transversely of the trail by suitable thrust collars 58. The guideways 53 and the forward and rear edges of the plate 52 are curved as shown in Figure 7, to permit the vehicle to be turned without disturbing the plate 52. The timber 51 has a plurality of equally spaced openings 59 arranged in the arc of a circle having the same center as the curved edges of the plate 52, and the plate 52 carries, at each end, a removable pin 61 adapted to engage in the openings 59.

When it is desired to bring the gun to proper position for firing, the vehicle is transported to the selected place, the plate 52 carried by the rear end of the trail is placed on the timber 51 and moved thereon so as to point the gun in approximately the direction of fire, the pins 61 inserted through the plate 52 and into the proper openings 59 so as to prevent the plate 52 from moving relatively to the timber 51, and then the screw 57 is operated to accurately train the gun.

It is, of course, obvious that our invention is susceptible of various modifications and changes which are within the spirit of the invention without departing from the scope of the following claim:

What we claim is:

A traction unit of the endless track-laying type having a transverse beam member upon which the article to be carried is adapted to be mounted, longitudinally disposed members at each end of said transverse beam member for supporting the ends thereof, a frame at each end of said beam member for supporting said end members, wheels at opposite ends of said frames, an endless track passing around said wheels and under and over said frame, springs between the end supporting members and said frame and a plate above each end supporting member for supporting the track as it passes thereabove.

Signed at Washington, D. C., this 28th day of January, 1919.

HARVEY DELANO.
GEORGE A. CHADWICK.
SILAS V. KEMP.